United States Patent
Lee et al.

(10) Patent No.: US 9,630,580 B2
(45) Date of Patent: Apr. 25, 2017

(54) BACK BEAM FOR DRIVING APPARATUS HAVING REINFORCEMENT PART

(71) Applicant: LG Hausys, Ltd., Seoul (KR)

(72) Inventors: Kyung Hoon Lee, Seoul (KR); Hee June Kim, Seongnam-si (KR); Yong Kil Kil, Gimpo-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/762,203

(22) PCT Filed: Dec. 20, 2013

(86) PCT No.: PCT/KR2013/011915
§ 371 (c)(1),
(2) Date: Jul. 21, 2015

(87) PCT Pub. No.: WO2014/115970
PCT Pub. Date: Jul. 31, 2014

(65) Prior Publication Data
US 2015/0353042 A1    Dec. 10, 2015

(30) Foreign Application Priority Data
Jan. 25, 2013 (KR) .......................... 10-2013-0008818

(51) Int. Cl.
*B60R 19/18* (2006.01)

(52) U.S. Cl.
CPC ........ *B60R 19/18* (2013.01); *B60R 2019/186* (2013.01); *B60R 2019/1806* (2013.01)

(58) Field of Classification Search
CPC .............. B60R 19/18; B60R 2019/186; B60R 2019/1806

USPC ......................................................... 296/102
See application file for complete search history.

(56) References Cited

U.S. PATENT DOCUMENTS

| 4,756,948 A * | 7/1988 | Kuramochi ............. B60R 19/18 428/167 |
| 2004/0094975 A1 | 5/2004 | Shuler et al. |
| 2011/0109105 A1 | 5/2011 | Ralston et al. |

(Continued)

FOREIGN PATENT DOCUMENTS

| CN | 1849234 A | 10/2006 |
| EP | 0254530 B1 | 10/1990 |
| EP | 1067039 A1 | 1/2001 |

(Continued)

OTHER PUBLICATIONS

Extended European Search Report dated Dec. 14, 2015 in connection with the counterpart European Patent Application No. 13872291.3, citing the above reference(s).

(Continued)

*Primary Examiner* — Joseph D Pape
*Assistant Examiner* — Dana Ivey
(74) *Attorney, Agent, or Firm* — Hauptman Ham, LLP

(57) ABSTRACT

The present invention provides a back beam for vehicle, which includes: a back-beam body formed in an arcuate shape and having a predetermined length; and reinforcement parts protruding from a plurality of portions of a front surface of the back-beam body and spaced apart from each other with intervals gradually varying toward both ends from a central portion of the back-beam body.

15 Claims, 8 Drawing Sheets

(56) References Cited

U.S. PATENT DOCUMENTS

2012/0286529 A1* 11/2012 Gukkenberger ........ B60R 19/18
                                                                                   293/132

FOREIGN PATENT DOCUMENTS

| EP | 1277622 A1 | 1/2003 |
| EP | 2113424 A1 | 11/2009 |
| JP | 2002321576 A | 11/2002 |
| WO | 2005012043 A1 | 2/2005 |

OTHER PUBLICATIONS

International Search Report for PCT/KR2013/011915 mailed on Mar. 25, 2014, citing the above reference(s).

Chinese Office Action dated Jul. 29, 2016 in connection with the counterpart Chinese Patent Application No. 201380071277.7, citing the above reference(s).

* cited by examiner

BACK BEAM FOR DRIVING APPARATUS HAVING REINFORCEMENT PART

CROSS REFERENCE TO RELATED APPLICATION

This application claims the priority of Korean Patent Application No. 10-2013-0008818, filed on Jan. 25, 2013 in the KIPO (Korean Intellectual Property Office). Further, this application is the National Phase application of International Application No. PCT/KR2013/011915 filed on Dec. 20, 2013, which designates the United States and was published in Korean.

TECHNICAL FIELD

The present invention relates, in general, to a back beam for a driving apparatus. More particularly, the invention relates to a back beam for a driving apparatus having a reinforcing part, which is capable of efficiently dispersing impact energy generated in the event of a collision.

BACKGROUND ART

Generally, bumpers for a vehicle are installed at the front and back of a vehicle body to protect the vehicle body and passengers as well as a hood, an engine and various devices installed in an engine room, in the event of various collision accidents including a rear-end collision.

Further, the bumper should satisfy impact requirements of every country's rule, should have high rigidity and excellent impact resistance over a wide temperature range, and should be small in expansion and contraction for a temperature change.

Such a general bumper is composed of a bumper cover defining an appearance of the bumper, a shock absorbing member maintaining a shape of the bumper cover, cushioning impact in the event of a collision and having a shape restoring function, and a back beam coming into contact with the shock absorbing member and absorbing collision energy through elastic deformation or plastic deformation.

The above-mentioned back beam is problematic in that it is formed into an arcuate shape, so that stress concentrates on a central portion in the event of a collision. Thus, the central portion of the back beam is prone to be damaged in the event of the collision.

Further, if such a back beam is formed of plastics, it is vulnerable to damage. Meanwhile, if the back beam is formed of metal, it is vulnerable to plastic deformation.

DISCLOSURE

Technical Problem

Accordingly, the present invention has been made keeping in mind the above problems occurring in the related art, and is intended to provide a back beam for a driving apparatus having a reinforcing part, which is capable of efficiently dispersing impact energy generated in the event of a collision.

Technical Solution

In an aspect, the present invention provides a back beam for a driving apparatus, including a back-beam body formed into an arcuate shape and having a predetermined length; and reinforcing parts formed on a front surface of the back-beam body in such a way as to protrude therefrom at a plurality of positions.

Preferably, the reinforcing parts may be formed on the front surface of the back-beam body and may protrude at a preset interval in such a way as to have a predetermined length in a direction crossing the longitudinal direction.

Preferably, the reinforcing parts may comprise a plurality of shock absorbing ribs that protrude from the front surface of the back-beam body.

Preferably, the reinforcing parts may comprise a plurality of shock absorbing protrusions that protrude from the front surface of the back-beam body, along a line in a direction of the interval.

Preferably, an interval between the shock absorbing ribs may be formed to be gradually increased from a central portion of the back-beam body to both sides thereof.

Preferably, each shock absorbing rib may be formed to have a protruding height of 10 mm or more with respect to an outer surface of the back-beam body.

Preferably, the shock absorbing ribs may be formed to be perpendicular to the longitudinal direction of the back-beam body.

Preferably, the shock absorbing ribs may be formed in the longitudinal direction of the back-beam body to be spaced apart from each other.

Further, a width and a height of each of the reinforcing ribs forming the first reinforcing part may be in a ratio of 2:1 and may have the same length as a length of either of the first reinforcing part or the second reinforcing part.

A width and a height of each of the reinforcing ribs forming the second reinforcing part may be in a ratio of 1:1 and may have the same length as a length of either of the first reinforcing part or the second reinforcing part.

An interval between the reinforcing ribs forming the first reinforcing part may be one to two times as large as the width of each of the reinforcing ribs of the first reinforcing part.

An interval between the reinforcing ribs forming the second reinforcing part may be two or more times as large as the width of each of the reinforcing ribs of the second reinforcing part.

For example, preferably, each of the reinforcing ribs forming the first reinforcing part may be 10 mm in width and 5 mm in height, and may have the same length as the length of back-beam body. Each of the reinforcing ribs forming the second reinforcing part may be 5 mm in width and 5 mm in height, and may have the same length as the length of the back-beam body.

Preferably, the reinforcing ribs forming the first reinforcing part may have the interval of 10 mm, while the reinforcing ribs forming the second reinforcing part may have the interval of 25 mm. Further, it is preferable that the interval between the shock absorbing protrusions is gradually reduced from the central portion of the back-beam body towards both sides thereof.

A central region and a pair of side regions located on opposite sides of the central region may be formed on the front surface of the back-beam body.

The reinforcing parts may include a first reinforcing part formed on the central region, and a second reinforcing part formed on each of the side regions, A width, a length, and a height of each of the shock absorbing protrusions forming the first reinforcing part may be in a ratio of 2:2:1.

A width, a length, and a height of each of the shock absorbing protrusions forming the second reinforcing part may be in a ratio of 1:1:1.

An interval between the shock absorbing protrusions forming the first reinforcing part may be two times as large as the width of each of the shock absorbing ribs forming the first reinforcing part, and An interval between the shock absorbing protrusions forming the second reinforcing part may be two times as large as the width of each of the shock absorbing protrusions of the second reinforcing part.

For example, it is preferable that each of the shock absorbing protrusions forming the first reinforcing part is 10 mm in width*10 mm in length*5 mm in height and each of the shock absorbing protrusions forming the second reinforcing part is 5 mm in width*5 mm in length*5 mm in height.

Preferably, the shock absorbing protrusions forming the first reinforcing part may be formed to have the interval of 20 mm, while the shock absorbing protrusions forming the second reinforcing part may be formed to have the interval of 10 mm.

Preferably, the reinforcing part may be formed to have a polygonal cross-section.

Preferably, the back-beam body may be formed of any of metal, high-strength plastics or a composite material.

Advantageous Effects

As described above, the present invention is advantageous in that it is possible to efficiently disperse impact energy generated in the event of a collision.

Further, the present invention is advantageous in that, when a back beam collides with a collision surface, stress concentrated on a central portion of the back beam can be efficiently dispersed, thus efficiently preventing the back beam of a bumper from being broken or damaged.

BEST MODE

Hereinafter, a back beam for a driving apparatus having a reinforcing part according to the present invention will be described with reference to the accompanying drawings.

Figure 1:
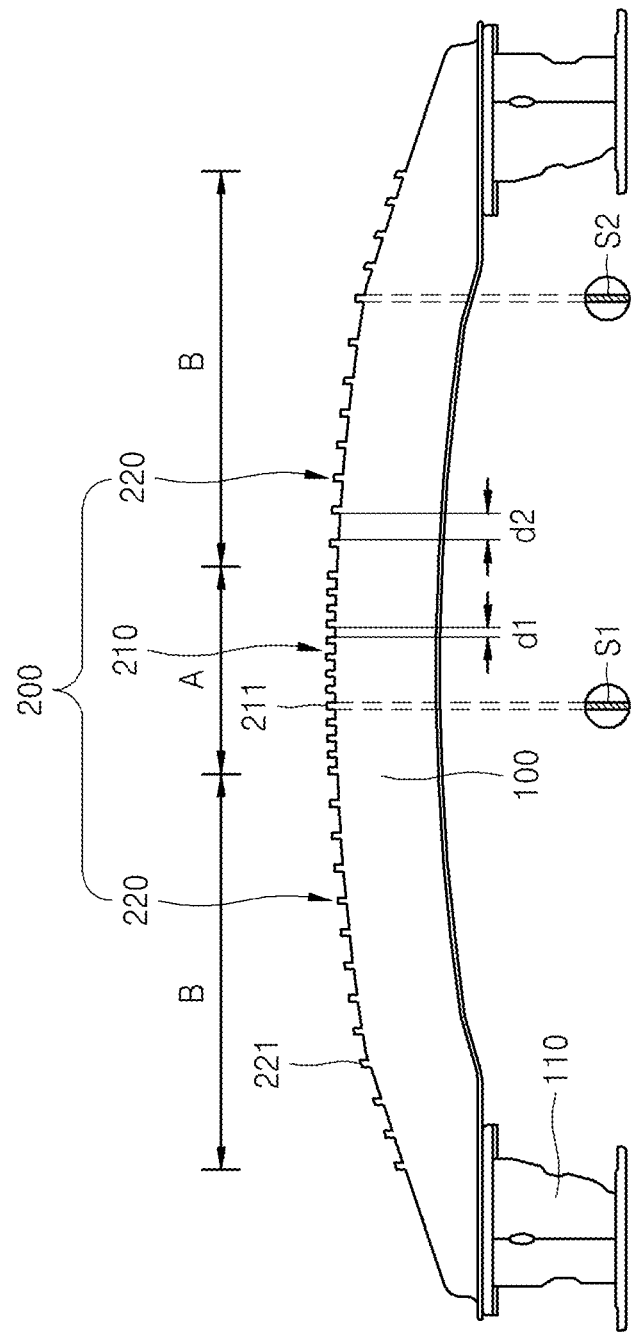
FIG. 1 is a view illustrating a back beam for a driving apparatus having a reinforcing part according to the present invention.
Figure 2:
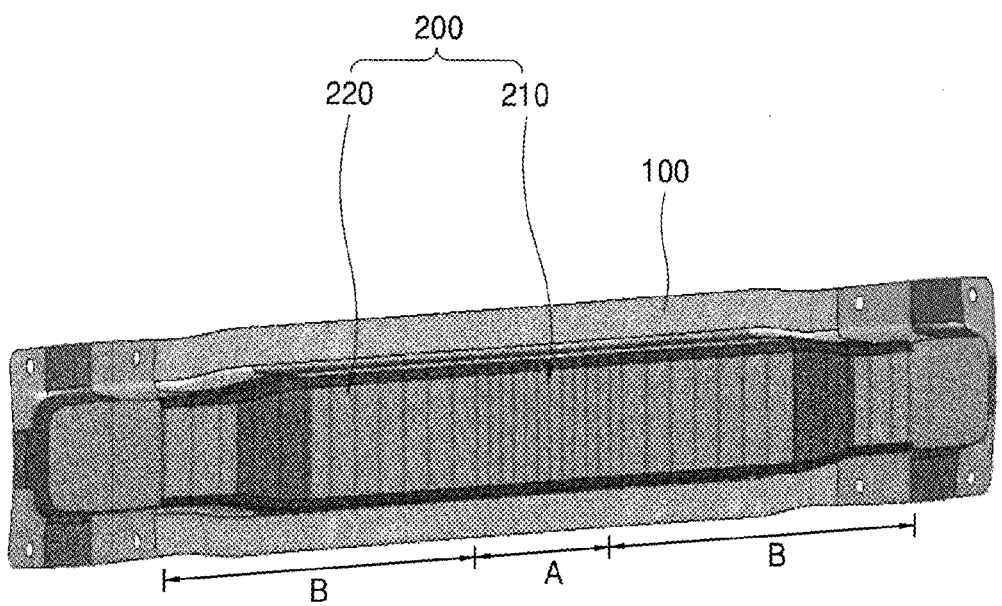
FIG. 2 is a perspective view illustrating the back beam for the driving apparatus having the reinforcing part according to the present invention.

FIGS. 1 and 2 illustrate a back beam for a driving apparatus having a reinforcing part according to a first embodiment of the present invention.

Referring to FIGS. 1 and 2, the back beam for the driving apparatus according to the present invention includes a back-beam body 100, and reinforcing parts 200.

The back-beam body 100 is formed to have a predetermined length and thickness. The back-beam body 100 is formed into an arcuate shape. Thus, the back-beam body 100 is formed to be convex at a side thereof.

A crash box 110 for coping with collision may be provided on a rear surface of each of opposite ends of the back-beam body 100.

The back-beam body 100 may be formed of high-strength plastics, metal, or a composite material.

Further, a length from a center of the back-beam body 100 to an end thereof may be 490 mm.

The reinforcing parts 200 according to the present invention are formed on a front surface of the back-beam body 100 to be integrated with the back-beam body 100.

The reinforcing parts 200 are formed on the front surface of the back-beam body 100 to protrude therefrom. The protruding lengths of the reinforcing parts 200 may be equal to each other.

As shown in FIG. 2, shock absorbing ribs according to the present invention are formed to be perpendicular to a longitudinal direction of the back beam.

The reinforcing parts 200 comprise a plurality of shock absorbing ribs 211 and 221 that protrude from the front surface of the back-beam body 100.

The plurality of shock absorbing ribs 211 and 221 are vertically formed on the front surface of the back-beam body 100 to be parallel to each other. That is, the plurality of shock absorbing ribs 211 and 221 are formed to cross the longitudinal direction of the back-beam body 100, preferably, to be perpendicular thereto.

The plurality of shock absorbing ribs 211 and 221 protrude from the front surface of the back-beam body 100 in such a way as to be spaced apart from each other.

Meanwhile, a central region A and a pair of side regions B that are at opposite sides of the central region A are formed on the front surface of the back-beam body 100 in the longitudinal direction thereof.

Further, the reinforcing parts 200 may include a first reinforcing part 210 formed on the central region A of the back-beam body 100, and a second reinforcing part 220 formed on each side region B of the back-beam body 100.

A width of the central region A may be formed to be narrower than a width of each side region B.

In such a case, an interval between first shock absorbing ribs 211 constituting the first reinforcing part 210 formed on the central region A may be a first interval d1. The first interval d1 may be 10 mm.

Further, an interval between a plurality of second shock absorbing ribs 221 constituting the second reinforcing part 220 may be a second interval d2. The second interval d2 may be 25 mm.

Preferably, the first interval d1 is formed to be narrower than the second interval d2.

Thus, in the back beam of the present invention, the intervals of the shock absorbing ribs 211 and 221 are set such that the ribs are denser in the central region A of the back-beam body 100 as compared to each side region B of the back-beam body 100, thus mitigating stress concentration on the central region A of the back-beam body 100 in the event of a collision.

That is, the intervals of the shock absorbing ribs 211 and 221 are set to be gradually increased from the central region of the back-beam body 100 to both the side regions thereof.

Further, the shock absorbing ribs 211 and 221 may be shaped to extend in the longitudinal direction of the back-beam body 100.

Each of the reinforcing ribs 211 constituting the first reinforcing part 210 is 10 mm in width and 5 mm in height, and has the same length as the length of the back-beam body 100.

Further, each of the reinforcing ribs 221 constituting the second reinforcing part 220 is 5 mm in width and 5 mm in height, and has the same length as the length of the back-beam body 100.

Thus, the reinforcing ribs 211 and 221 may be formed such that a shock absorbing surface of the reinforcing rib 211 is different in area from that of the reinforcing rib 221.

The above-mentioned width, height and interval may have tolerance of ±2 mm while having the above ratio. A lower limit of the tolerance is 2 mm that is a minimum length element.

Therefore, the protruding height of the reinforcing part 200 is 5 mm or approximately 5 mm in consideration of the tolerance, thus preventing the reinforcing part 200 from being bent or broken when it excessively collides with an external object.

In summary, a ratio of the width to the height of each reinforcing rib 211 forming the first reinforcing part 210 is 2:1. The reinforcing rib 211 has the same length as the length of either of the first reinforcing part 210 or the second reinforcing part 220.

A ratio of the width to the height of each reinforcing rib 221 forming the second reinforcing part 220 is 1:1. The reinforcing rib 221 has the same length as the length of either of the first reinforcing part 210 or the second reinforcing part 220.

Further, the interval between the reinforcing ribs 211 forming the first reinforcing part 210 is one to two times as large as the width of the reinforcing rib 211 of the first reinforcing part 210, while the interval between the reinforcing ribs 221 forming the second reinforcing part 220 is two or more times as large as the width of the reinforcing rib 221 of the second reinforcing part 220.

MODE FOR INVENTION

Figure 3:
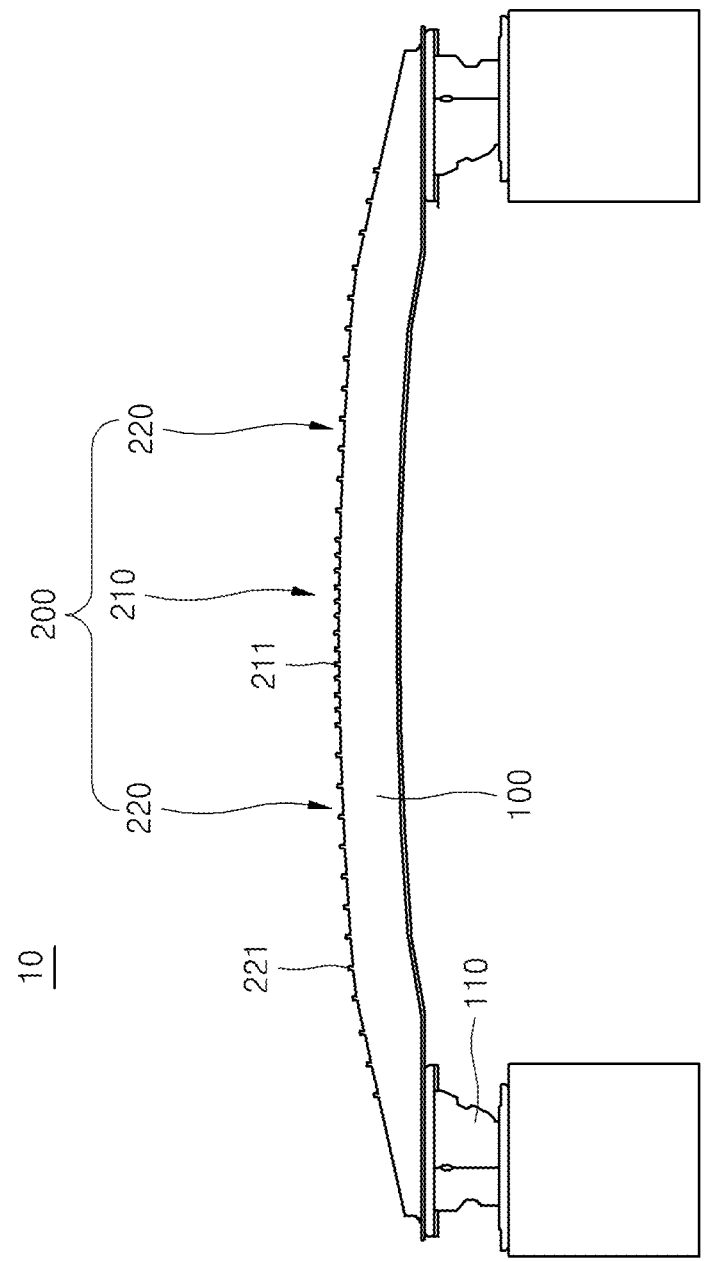
FIG. 3 is a view illustrating the back beam for the driving apparatus having the reinforcing part according to the present invention, before a collision test.
Figure 4:
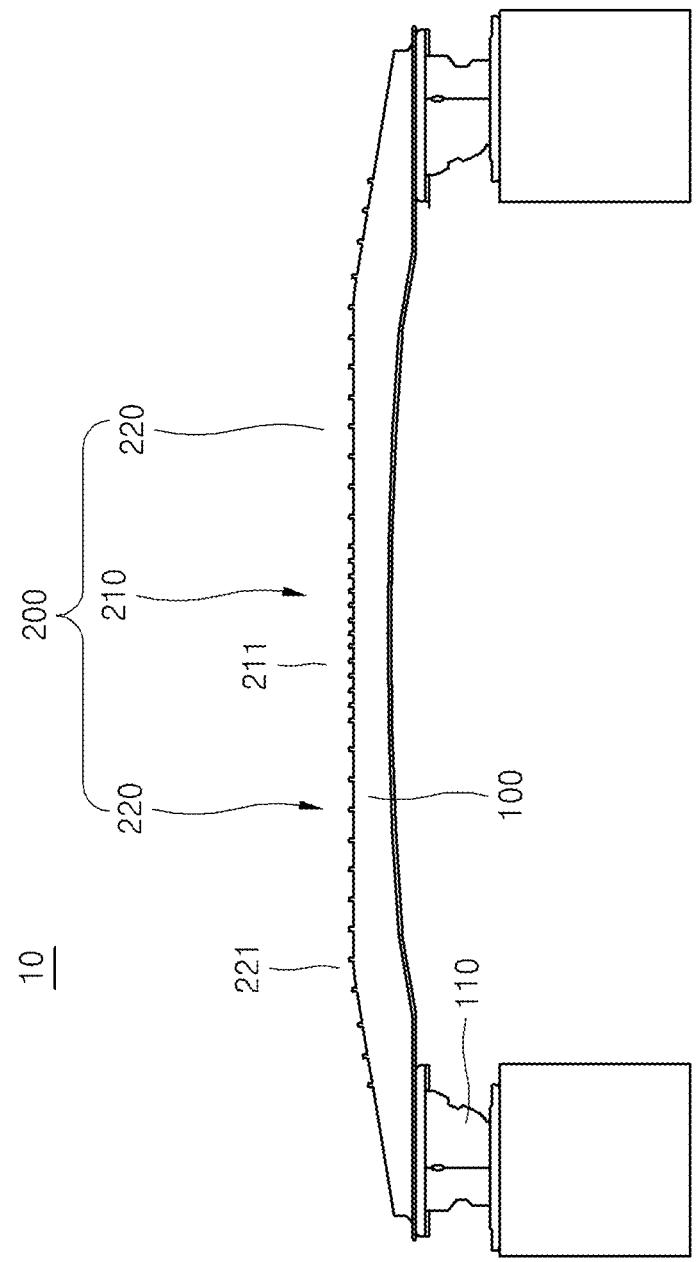
FIG. 4 is a view illustrating the back beam for the driving apparatus having the reinforcing part according to the present invention, after the collision test.

Next, the operation of the back beam according to the present invention configured as such will be described FIG. 3 is a view illustrating the back beam for the driving apparatus having the reinforcing part according to the present invention before a collision test, and FIG. 4 is a view illustrating the back beam for the driving apparatus having the reinforcing part according to the present invention after the collision test.

Referring to FIG. 3, the crash boxes 110 are provided on the rear surfaces of both ends of the back-beam body 100. FIG. 3 illustrates the state before the collision test is performed.

As shown in FIG. 3, the back-beam body 100 collides with the collision surface 10.

Referring to FIG. 4, the central region A of the back-beam body 100 first collides with the collision surface 10, so that stress may concentrate on the central region A.

Here, the first shock absorbing ribs 211 forming the first reinforcing part 210 provided on the central region A collide with the first collision surface 10. Thus, an impact force generated during the collision with the collision surface 10 may be dispersed by the plurality of first shock absorbing ribs 211.

In addition, the central region A of the arcuate-shaped back-beam body 100 is stretched flat in the event of the collision. The impact force generated by the stretching may concentrate on the central region A, so that a stress concentration phenomenon may occur.

This stress concentration phenomenon may be easily mitigated while the impact force is dispersed by the first shock absorbing ribs 211.

Moreover, the shock absorbing ribs 221 of the second reinforcing parts 220 formed on the pair of side regions B collide sequentially with the collision surface 10, thus easily dispersing the impact force generated by the collision.

The back beam according to the present invention is designed such that the shock absorbing area of the shock absorbing ribs 211 of the first reinforcing part 210 that first collides with the collision surface 10 is larger than the shock absorbing area of the shock absorbing ribs 221 of the second reinforcing part 220. Thereby, shocks generated during the first collision are mostly absorbed by the central region, and are easily dispersed to both sides.

Next, another example of the reinforcing part according to the present invention will be described.

As described above, a representative example where the reinforcing part 200 comprises the plurality of ribs has been described with reference to FIGS. 1 to 5.

Further, shapes other than the rib shape are possible as the reinforcing part 200 according to the present invention, as long as the impact force may be absorbed at a plurality of positions.

Figure 5:
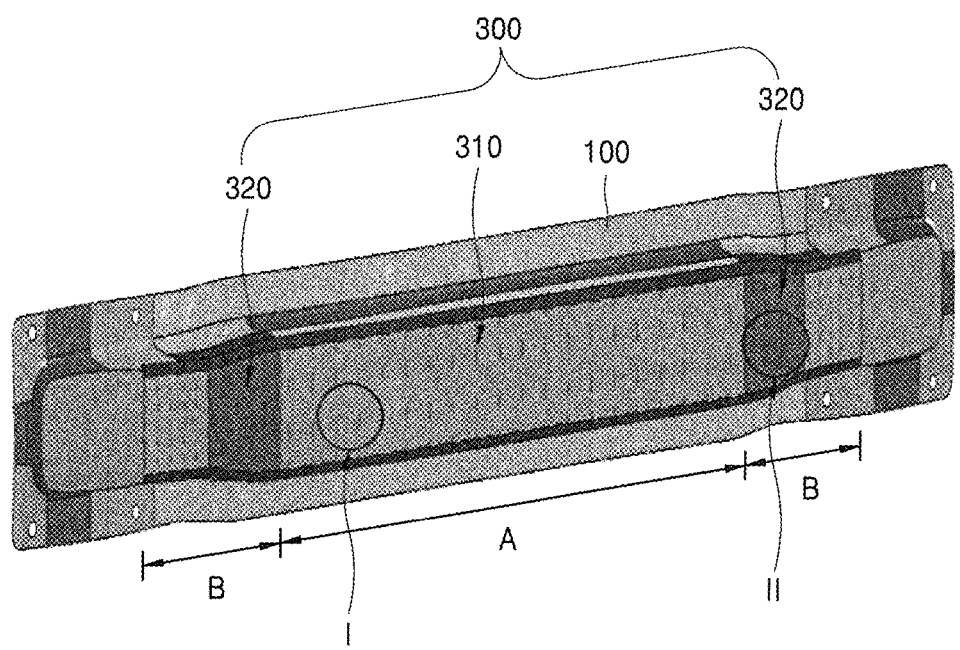
FIG. 5 is a perspective view illustrating a back beam to which another example of the reinforcing part according to the present invention is applied.
Figure 6:
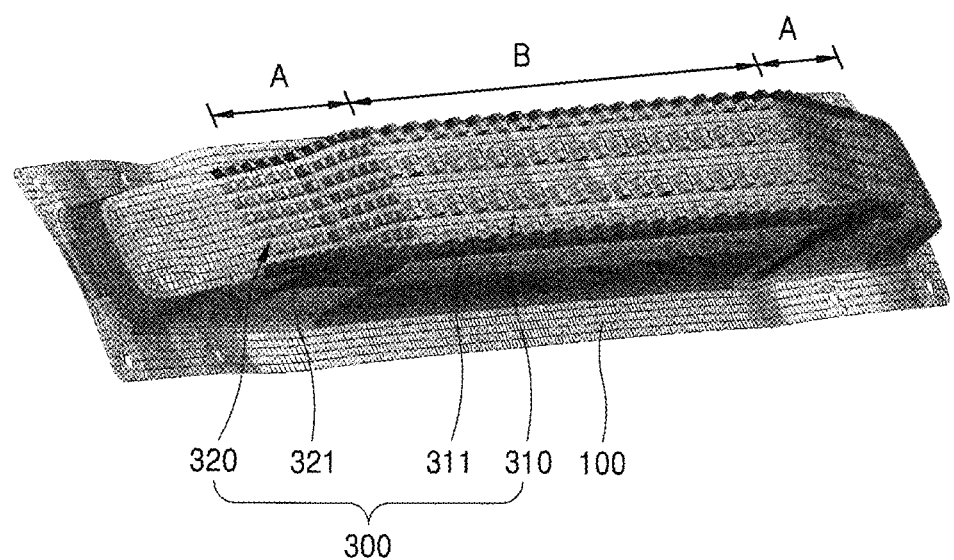
FIG. 6 is another perspective view illustrating the back beam to which another example of the reinforcing part according to the present invention is applied.

FIGS. 5 and 6 illustrate the back beam to which another example of the reinforcing part according to the present invention is applied.

Referring to FIGS. 5 and 6, a reinforcing part 300 formed on the front surface of the back-beam body 100 may comprise a plurality of shock absorbing protrusions 311 and 321. The reinforcing part 300 is composed of a first reinforcing part 310 and a second reinforcing part 320.

The shock absorbing protrusions 311 and 321 comprise first shock absorbing protrusions 311 forming the first reinforcing part 310, and second shock absorbing protrusions 321 forming the second reinforcing part 320.

The first shock absorbing protrusions 311 are formed on the central region A of the back-beam body 100, while the second shock absorbing protrusions 321 are formed on each side region B.

The first and second shock absorbing protrusions 311 and 321 according to the present invention protrude to the front of the back-beam body 100.

Therefore, the first and second shock absorbing protrusions 311 and 321 which are hollow therein serve to efficiently absorb and disperse the impact force in the event of the collision.

Figure 7:
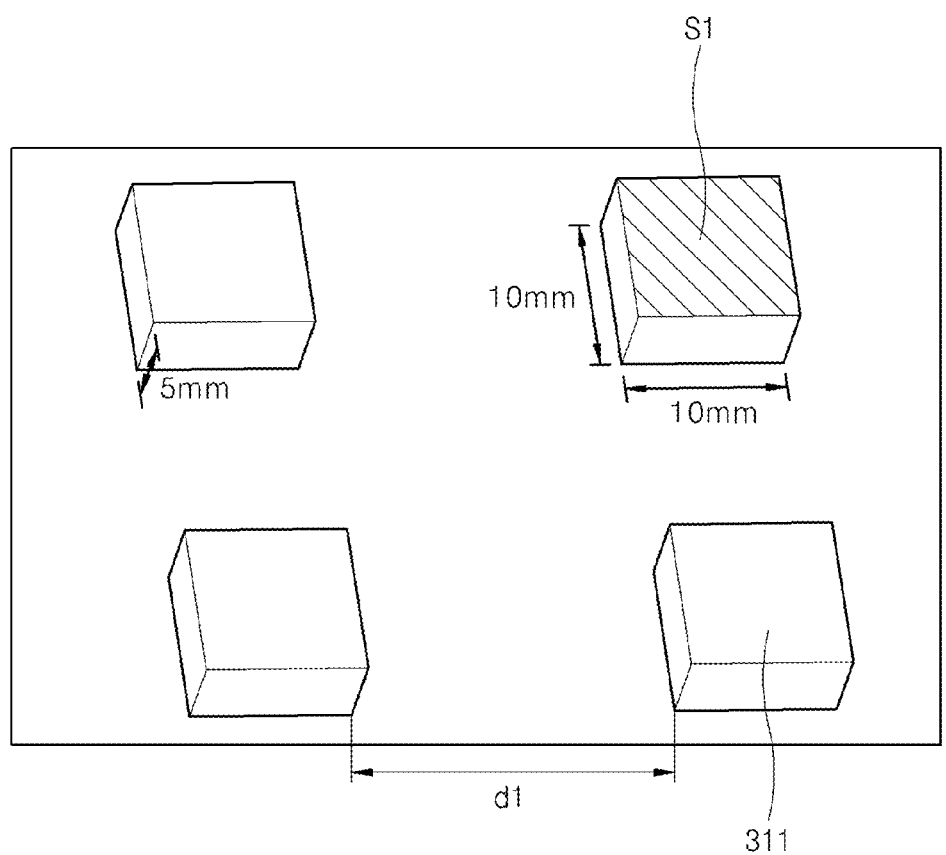
FIG. 7 is an enlarged perspective view illustrating portion I encircled in FIG. 5.
Figure 8:
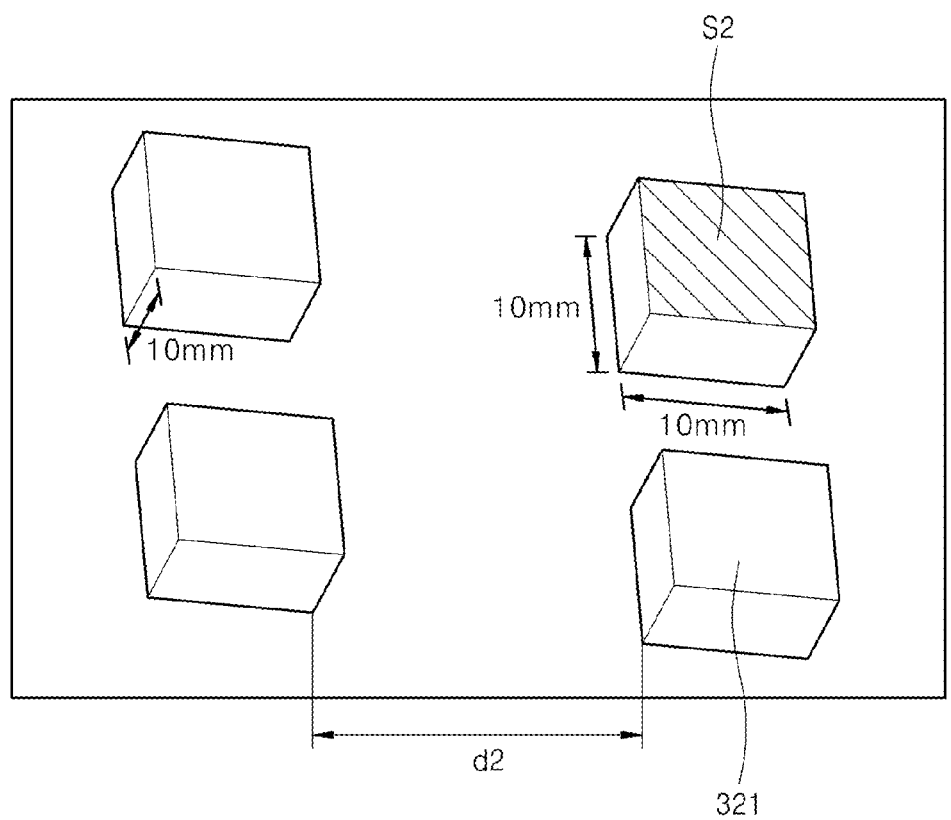
FIG. 8 is an enlarged perspective view illustrating portion II encircled in FIG. 5.

In FIGS. 5 and 6, the width of the central region A is larger than that of each side region B. As shown in FIGS. 7 and 8, a first interval d1 between the first shock absorbing protrusions 311 formed on the central region A is larger than a second interval d2 between the second shock absorbing protrusions 321 formed on each side region b.

Here, the first shock absorbing protrusion 311 present in the central region A has a size of 10 mm in width×10 mm in length×5 mm in height.

Further, the second shock absorbing protrusion 321 present in the side region has a size of 5 mm in width×5 mm in length×5 mm in height.

The interval d1 between the first shock absorbing protrusions 311 of the central region A is 20 mm, while the interval d2 between the second shock absorbing protrusions of the side region is 10 mm.

That is, the shock absorbing protrusions 311 and 321 are formed such that their intervals are gradually reduced from the central portion of the back-beam body 100 to both sides thereof.

The above-mentioned width, length, height and interval may have the tolerance of ±2 mm while having the above-mentioned ratio. The lower limit of the tolerance is 2 mm that is a minimum length element.

Therefore, the height of each of the first and second shock absorbing protrusions 311 and 321 is 5 mm or approximately 5 mm in consideration of the tolerance, thus preventing the reinforcing part 300 from being bent or broken when it excessively collides with an external object.

Further, the intervals of the first and second shock absorbing protrusions 311 and 321 are set to be about two times as large as minimum widths thereof, thus defining a space that allows the first and second shock absorbing protrusions 311 and 321 to be easily removed through gaps therebetween when they collide with an external object and thereby are broken.

That is, such a configuration solves a problem where a collision absorbing ability is lowered because the broken shock absorbing protrusions are fitted and remain between other protrusions on the back-beam body.

In summary, each of the shock absorbing protrusions 311 forming the first reinforcing part 310 is sized such that the width, length and height thereof are in the ratio of 2:2:1. Each of the shock absorbing protrusions 321 forming the second reinforcing part 320 is sized such that the width, length and height thereof are in the ratio of 1:1:1.

Further, the interval between the shock absorbing ribs 311 forming the first reinforcing part 310 is two times as large as the width of each of the shock absorbing ribs 311 forming the first reinforcing part 310, while the interval between the shock absorbing ribs 321 forming the second reinforcing part 320 is two times as large as the width of each of the shock absorbing ribs 321 forming the second reinforcing part 320.

In the above configuration, while an external object generally collides with an S1 area of each first shock absorbing protrusion 311 on the central region A that is larger than an S2 area on the side region B, it is possible to mitigate stress concentration on the central region A of the back-beam body 100 during the collision.

That is, according to the present invention, the shock absorbing area of the first shock absorbing protrusions 311 is designed to be larger than the shock absorbing area of the second shock absorbing protrusions 321, thus allowing most of shocks generated during the first collision to be absorbed by the central region and be easily dispersed to both sides.

Therefore, when the reinforcing part 300 collides with the collision surface 10, another example of the reinforcing part 300 allows the plurality of shock absorbing protrusions 311 and 321 forming the reinforcing part 300 to absorb the impact force at multiple absorbing positions.

Accordingly, the impact force absorbed by the respective shock absorbing protrusions 311 and 321 may be easily and individually dispersed in all directions of the shock absorbing protrusions 311 and 321.

That is, when the back beam collides with the collision surface 10, it is possible to more efficiently prevent a phenomenon where stress concentrates on the central region A of the back-beam body 100.

Meanwhile, the representative example where the reinforcing part according to the present invention comprises longitudinal shock absorbing ribs or shock absorbing protrusions has been described.

In addition, although not shown in the drawings, the present invention may include an example where two or more rows of reinforcing parts are arranged in the longitudinal or transverse direction of the back-beam body.

Further, the reinforcing part according to the present invention is formed in the transverse or longitudinal direction of the back-beam body on the front surface thereof. In this regard, the reinforcing part may be formed in a zigzag or grid shape.

When the reinforcing part is formed in the grid shape, the size of the grid may be set such that a portion of the grid on which stress concentrates is denser.

The embodiment according to the present invention can efficiently disperse the impact energy generated during the collision.

Further, when the back beam collides with the collision surface, the embodiment according to the present invention can efficiently disperse stress that concentrates on the central portion of the back beam and thereby efficiently prevent damage to the bumper back beam.

The invention claimed is:

1. A back beam for a driving apparatus, comprising:
a back-beam body having an arcuate shape in a longitudinal direction of the back-beam body; and
reinforcing parts comprising a plurality of shock absorbing protrusions protruded from a front surface of the back-beam body,
wherein the front surface of the back-beam body comprises
a central region, and
a pair of side regions located on opposite sides of the central region,
wherein the plurality of shock absorbing protrusions includes
first shock absorbing protrusions arranged at intervals in the central region, and
second shock absorbing protrusions arranged at intervals in the side regions, and
wherein first intervals of the first shock absorbing protrusions in the central region are different from second intervals of the second shock absorbing protrusions in at least one of the side regions.

2. The back beam according to claim 1,
wherein the plurality of shock absorbing protrusions has a rib shape, and
wherein the first intervals are narrow than the second intervals.

3. The back beam according to claim 2, wherein the first and second intervals gradually increase from the central region to both the side regions.

4. The back beam according to claim 2, wherein each shock absorbing protrusions of the plurality of shock absorbing protrusions is perpendicular to the longitudinal direction of the back-beam body.

5. The back beam according to claim 1,
wherein the plurality of shock absorbing protrusions has a rectangular shape, and
wherein the first intervals are wider than the second intervals.

6. The back beam according to claim 5, wherein the first and second intervals gradually decrease from the central region to both the side regions.

7. The back beam according to claim 5, wherein at least one protrusions of the plurality of shock absorbing protrusions comprises an internal space therein.

8. The back beam according to claim 5, wherein the back-beam body is formed of any of metal, high-strength plastics or a composite material.

9. The back beam according to claim 5, wherein an area of the central region comprising the first shock absorbing protrusions is larger than an area of both side regions having the second shock absorbing protrusions.

10. The back beam according to claim 1, wherein the plurality of shock absorbing protrusions has a polygonal cross-section.

11. The back beam according to claim 1, wherein the back-beam body is formed of any of metal, high-strength plastics or a composite material.

12. The back beam according to claim 1, wherein an area of the central region comprising the first shock absorbing protrusions is smaller than an area of the side regions having the second shock absorbing protrusions.

13. A back beam for a driving apparatus, comprising:
a back-beam body having an arcuate shape in a longitudinal direction of the back-beam body; and
reinforcing parts comprising a plurality of shock absorbing ribs protruded from a front surface of the back-beam body,
wherein the front surface of the back-beam body comprises
a central region, and
a pair of side regions located on opposite sides of the central region,
wherein the plurality of shock absorbing ribs includes
first shock absorbing ribs arranged at intervals in the central region, and
second shock absorbing ribs arranged at intervals in the side regions,
wherein first intervals of the first shock absorbing ribs in the central region are different from second intervals of the second shock absorbing ribs in at least one of the side regions, and
wherein a width to a height of each of the first shock absorbing ribs in the central region is in a ratio of 2:1, and a width to a height of each of the second shock absorbing ribs in the at least one of the side regions is in a ratio of 1:1,
wherein the first intervals are one to two times as large as the width of each of the first shock absorbing ribs in the central region, and the second intervals are two or more times as large as the width of each of the second shock absorbing ribs in at least one of the side regions.

14. The back beam according to claim 13, wherein a length of each of the first shock absorbing ribs in the central region or a length of each of the second shock absorbing ribs in the side regions is substantially equal to a width of the back-beam body.

15. A back beam for a driving apparatus, comprising:
a back-beam body having an arcuate shape in a longitudinal direction of the back-beam body; and
reinforcing parts comprising a plurality of shock absorbing protrusions protruded from a front surface of the back-beam body,
wherein the front surface of the back-beam body comprises
a central region, and
a pair of side regions located on opposite sides of the central region,
wherein the plurality of shock absorbing protrusions includes
first shock absorbing protrusions arranged at intervals in the central region, and
second shock absorbing protrusions arranged at intervals in the side regions,
wherein first intervals of the first shock absorbing protrusions in the central region are different from second intervals of the second shock absorbing protrusions in at least one of the side regions,
wherein a width to a length to a height of each of the first shock absorbing protrusions in the central region is in a ratio of 2:2:1, and a width to a length to a height of each of the second shock absorbing protrusions in the at least one of the side regions is in a ratio of 1:1:1, and
wherein the first intervals are two times as large as the width of each of the first shock absorbing protrusions in the central region, and the second intervals are two times as large as the width of each of the second shock absorbing protrusions in at least one of the side regions.

* * * * *